Jan. 2, 1934.　　　O. G. HAUSSMANN　　　1,942,333
OPHTHALMIC LENS
Filed Dec. 4, 1931　　　4 Sheets-Sheet 1
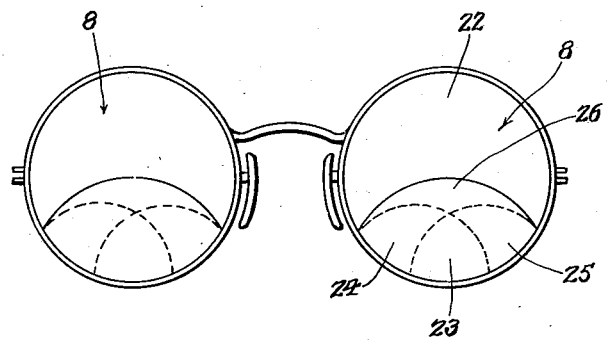
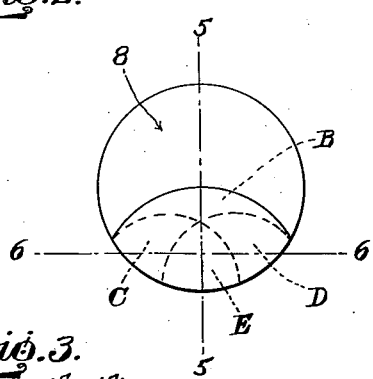
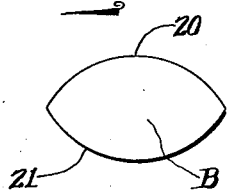
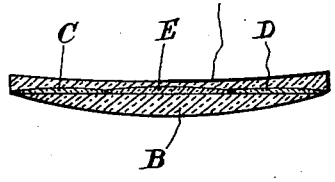
Inventor
Otto G. Haussmann
By Geo. P. Kimmel
Attorney Jan. 2, 1934.  O. G. HAUSSMANN  1,942,333
OPHTHALMIC LENS
Filed Dec. 4, 1931   4 Sheets-Sheet 2

Inventor
Otto G. Haussmann
By Geo. P. Kimmel
Attorney

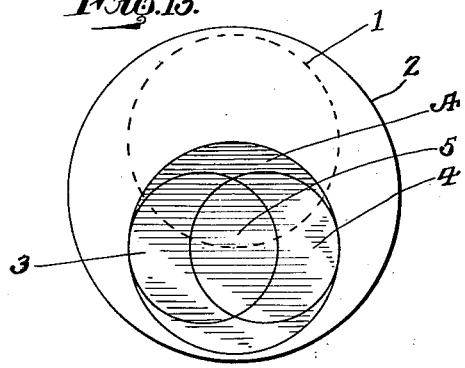
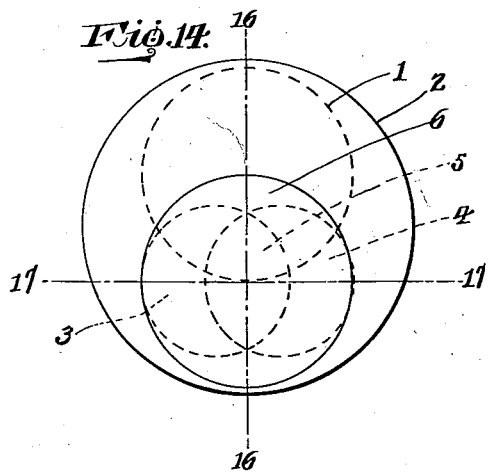
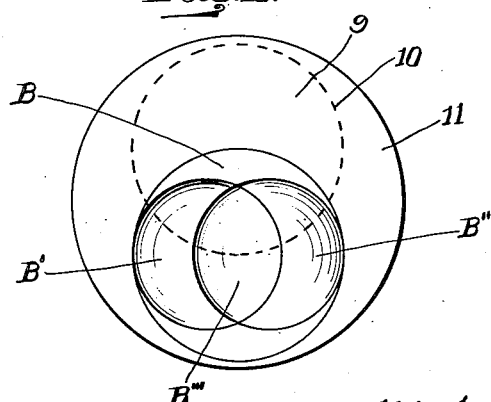
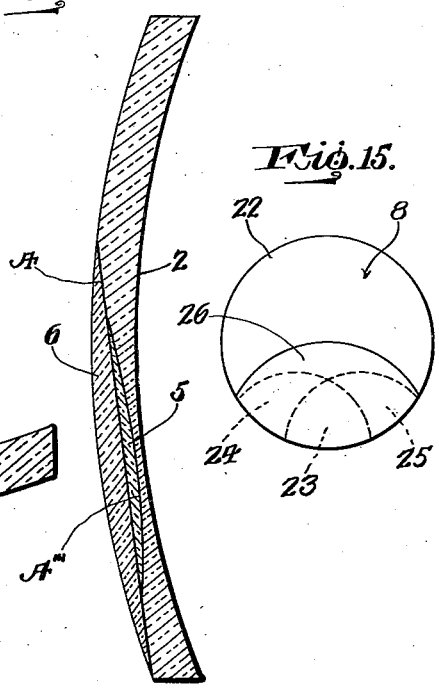
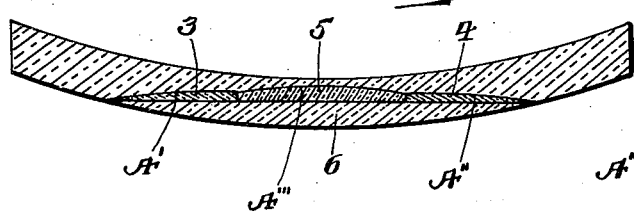

Jan. 2, 1934.    O. G. HAUSSMANN    1,942,333
OPHTHALMIC LENS
Filed Dec. 4, 1931    4 Sheets-Sheet 4

Inventor
Otto G. Haussmann

By Geo. P. Kimmel
Attorney

Patented Jan. 2, 1934

1,942,333

UNITED STATES PATENT OFFICE 1,942,333

OPHTHALMIC LENS

Otto G. Haussmann, Philadelphia, Pa.

Application December 4, 1931. Serial No. 579,050

9 Claims. (Cl. 88—54)

My invention relates to an ophthalmic lens commonly known as a multifocal.

Those who are engaged in the art of fitting glasses to correct optical defects have long recognized the shortcomings of the lenses commonly known as "bifocals". It is a well known fact that sooner or later in life, usually beginning shortly after the age of forty, the same lenses which are clear and comfortable for distance no longer suffice for reading or doing fine work, and a lens of stronger magnifying power must be used, which, while it takes the place of the failing accommodative power of the eye, will also blur the distant vision.

In order to maintain both clear distance vision and clear nearby vision in one pair of lenses bifocal lenses are used. The first record of bifocal lenses is contained in a letter written by Benjamin Franklin wherein he states that he had his distant lenses and reading lenses cut in half and inserted in one frame by a French optician.

So bifocal lenses have been in use for more than a century and a half and no claim is made on the principle of the lenses but claim is more in the nature of an improvement over all existing multifocal lenses particularly in the allocation of the various fields, the size and shape of the fields, and the relative focal powers of the fields in comparison to one another. An additional claim being the facility with which the upper or distant portion of the lens may be changed in its focal power without disturbing the focal power of the lower combinations, a change which cannot be easily made in any other bifocal lens.

It is a well known fact that all lenses having more than one focal field are more or less annoying to the eye, especially when first worn. This annoyance becomes more marked when there is a decided difference between the focal power of the upper and lower field. It is almost an axiom among refractionists that the greater the difference between the upper and lower field the more difficulty is encountered in wearing bifocals.

This difficulty is entirely done away with in my invention. Not only is the increase in the focal power more gradual but the shape of the portion intended for close reading, that of a truncated cone with its apex at the top, eliminates entirely the annoying doubling effect encountered in all other bifocal or multifocal lenses at the moment in which the eye encounters the wide dividing line. This shape with the apex upwards and its particular location is new and has not been made heretofore.

It is also a well known fact that bifocal lenses, especially when adapted to persons who have very little or no accommodation left (usually at the age of fifty-five or over) are not adequate to meet the requirements of those who are obliged to see not only at the regular reading distance of twelve to fourteen inches but also at distances of two or three feet. To meet this need many socalled trifocal and multi-focal lenses have been patented. The distribution of these fields has however never been attempted in the way accomplished in my invention, the usual method being to have two concentric fields of different radii, one above the other.

My invention includes an intermediate field of one or more focal powers located at the sides of the reading field which permits the eye to pass from one field to the other without moving the head. It is therefore of important value in certain vocational work, for instance for stenographers in transcribing their notes on the typewriter, for weavers and all elderly workers in the textile industry, for musicians, in short for all who need an intermediate distance in order to work with comfort. The shape of the two segments (to the right and left of the reading or closer vision segment) is so designed as to give a large and comfortable field of vision at intermediate distances. Moreover, these segments can be varied in their focal length so that the one field toward the nose has a shorter or longer focus than the outer field, an advantage not incorporated in any other style multi-focal lens. This advantage is apparent when one considers that when glancing either to the right or left the field toward the nose is always closer than the field toward the temporal sides and hence requires a shorter focal power.

The same flexibility relative to the focal power of the reading segment is possible in my invention. It may be made of any power in accordance with the prescription. While the relative power between the distance, the intermediate and the reading distance has in previous inventions been made arbitrarily, the reading portion usually being about twice the strength of the intermediate addition, this is not the case in my invention.

My invention also includes an upper segment (between the distance and reading segment of the lens) of a shape never before used in any of the multifocal lenses. It comprises a wide area giving a particularly unrestricted vision from side to side and therefore of great value to those who are compelled to read or observe sharply in a direction straight ahead at distances of three or more feet. The variation of the focal distance of this segment, from that of the upper or distance portion of the lens is so gradual that it at no time results in a doubling of the image with its attending danger in walking. In fact the variation in focus from all segments is so gradual that at no time is the wearer aware when his eye is passing from one field to the other, thus eliminating altogether the hazard in wearing the many different kinds of bifocal or multifocals already patented.

The essential objects of my invention are to provide an ophthalmic lens having incorporated therein five distinct and separate focal powers, intended to compensate for the failing accommodative powers of the human eye, with distinctive shapes and sizes of the various focal powers, in relation to one another; having a new method of distributing the visual fields; having a distinctive change in the size and shape of the upper intermediate field; having a distinctive change in the size and shape of the shorter focal field— that of a sistroid with the apex upwards; having a new method of distributing the intermediate side fields and a distinctive shape of these fields conforming more adequately to the required field of vision in those fields; having a possibility of changing the respective focal powers in corelation to and independent of the focal powers of the other fields; having a new practical and simple possibility of changing the distance or upper field in its focal power without interfering or marring in any way the focal powers of the lower fields; having greater invisibility of the various separations between the segments of the lenses due to the gradual, not sudden increase in their focal powers; affording greater ease and comfort, free of the disturbing elements of sudden changes from one field to the other; and to attain these ends in a strong, durable and comparatively inexpensive structure.

To the above ends essentially and others which may hereinafter appear, my invention consists of such parts and in such combination of parts which fall within the scope of the invention as claimed.

In the drawings:

Figure 1 is a front elevation of a spectacle frame provided with a pair of ophthalmic lenses in accordance with my invention.

Figure 2 is an elevation of a lens in accordance with my invention.

Figure 3 is a disassembled view in elevation of certain of the finished buttons forming elements of the lens.

Figure 4 is an elevation of the outer finished button forming an element of the lens.

Figure 5 is a section on line 5—5 Figure 2.

Figure 6 is a section on line 6—6 Figure 2.

Figures 7 to 14 illustrate the successive steps of one method capable of producing an ophthalmic lens in accordance with my invention.

Figure 15 is an elevation of the lens produced in accordance with the method having the steps thereof illustrated by Figures 7 to 14.

Figure 16 is a section on line 16—16 Figure 14.

Figure 17 is a section on line 17—17 Figure 14.

Figure 18 is an elevation of a basic lens employed in the production of a lens in accordance with my invention by a different method.

Figure 19 is a cross sectional view of a blank forming the basic lens shown in Figure 18 having a button fused therein and the latter in connection with the base lens after finishing will produce a lens in accordance with my invention.

The lens, in accordance with my invention includes a basic lens 1 (see Figure 6) having secured thereto focal segments B, C, D and E. Preferably the segments will be independent, but they may be formed integral with each other.

Figure 7:
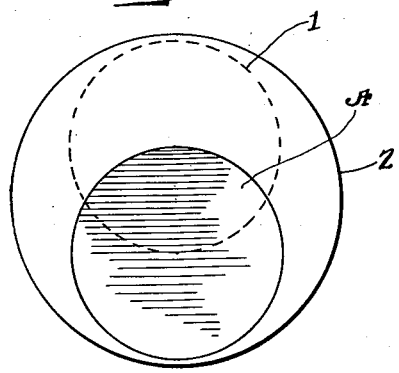

One method for producing a lens in accordance with my invention is as follows:

The basic crown glass lens 1 is delineated upon a blank 2 placed on a support and an indentation A, of circular form is ground on blank 2. The indentation has a part thereof extending across the lower portion of lens 1. The indentation A varying in relation to the outer curve of lens 1 according to the added power required in segment "B" of the finished lens. (See Figure 7.)

The diameter of this curve need not be constant and can be made of any required size considered most appropriate for the finished lens, it being self-evident that a smaller face needs a lens of smaller size. In my invention neither the size of the segments nor the relative proportion of the focal powers are constant, a liberal leeway being possible both in the size of the segments and in their focal power.

Figure 8:
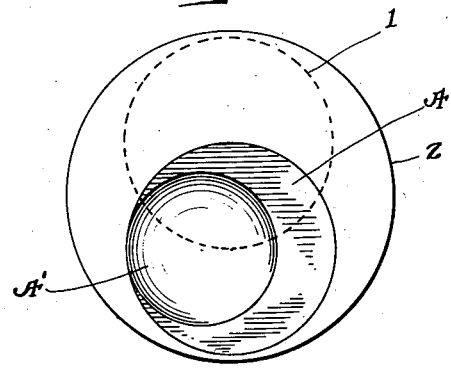
Figure 9:
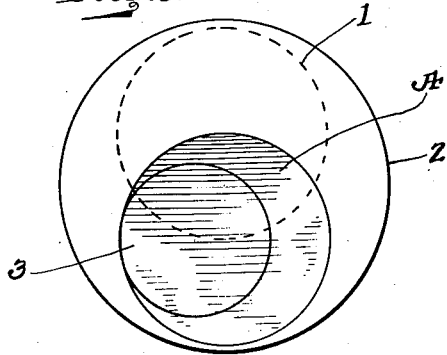

A second circular indentation A' governing and controlling the addition required for the segment "C" is then ground into the indentation "A" at the left side of the latter. See Figure 8. The depth of segment C will of course be governed according to the required focal power being however in all instances more concave than the indentation A. The diameter of this indentation A' is approximately two-thirds of the diameter of A. It is not necessary however that this proportion be strictly adhered to as the proportioned size of the lower field may be increased or decreased at will, the relative shape of the lower segments remaining the same. The button 3 from which segment C is formed is cemented to indentation A' and ground flush with indentation A. See Figure 9.

Figure 10:
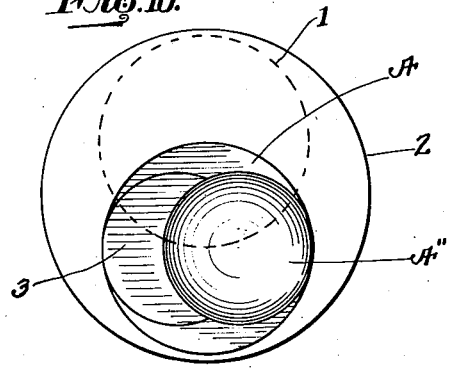

A third indentation A'' governing and controlling the addition required for segment D is then ground into the indentation A at the right side of the latter and in a portion of button 3. See Figure 10. The depth of this segment D may or may not be of the same curvature as that of segment C, it being necessary however that the diameter of the indentation A'' be the same as indentation A' to insure uniformity in the appearance of the finished lens. It is possible, therefore that in my invention the inner or nasal segment D can be made of a shorter or greater focal power than the outer or temporal segment C depending upon the focal power found necessary and prescribed for the wearer to give him the most comfort. This flexibility in the focal powers in the intermediate field provided by segments C and D has never before been applied and forms one of the salient advantages of my invention. Cemented into indentation A'' is a button 4 from which segment D is formed. The button 4 is ground flush with button 3 and indentation A.

Figure 11:
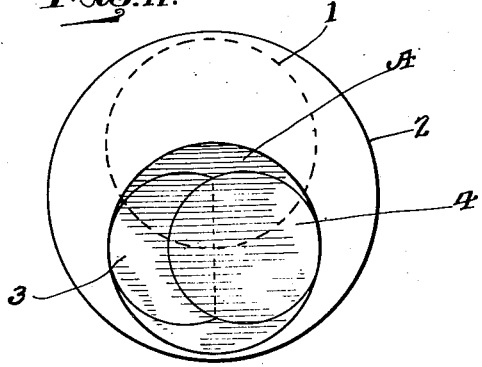
Figure 12:
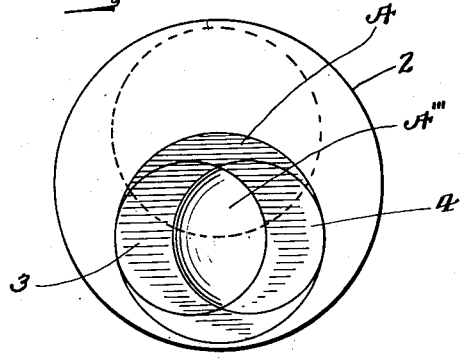

A fourth indentation A''' governing and controlling the addition required for segment "E" is then ground in buttons 3, 4 and indentation A and with its radial centre at the intersection formed by indentations A' and A''. See Figure 11. This indentation A''' being the deepest (most concave) of all the surrounding indentations will intersect the buttons 3 and 4. A button 5 is then cemented in indentation A''' and ground flush with the buttons 3 and 4. The button 5 provides segment E, and when the lens is completed segment E will be in the shape of a sistroid with the apex upwards and bulging outwards on either side. This shape of reading segment provided by segment E completely eliminates the doubling of the image when the eye passes from the distance to the reading portion and in itself, independent of the other features, is a decided deviation in form over any or all the segments now in use in bifocal lenses.

After the button 5 has been ground flush, a button 6 is cemented into indentation A and covering buttons 3, 4 and 5 and the exposed surface of button 6 ground flush with the outer face of basic lens 1. The segment B is provided by button 6. After button 6 has been positioned and ground the basic lens 1 is ground from blank 2 upon the delineating line 17 to provide the lens 8 shown in Figures 1, 2 and 15.

The lenses which are so constructed that the buttons providing the segments may be inserted either on a plano surface, a convex surface or a concave surface are based on the principle of different refractive index of glass, the basic lens, in which the spherical indentations are ground, being of crown glass with a refractive index of approximately 1.52 while the inserted segments are made of a glass having a higher refractive index (usually but not necessarily flint glass) of an index varying from 1.62 to 1.70.

The inserted buttons or buttons which provide the segments are either fused in the spherical indentations ground in the basic lens or cemented in with a transparent cement. If the higher refractive glass is fused it must necessarily have a lower melting point than the glass forming the basic lens.

With reference to Figures 18 and 19 the basic lens 9 is delineated as at 10 upon a blank 11, and the latter is then formed with indentations B, B', B'' and B''' corresponding to indentations A, A', A'' and A'''. A single button 12 is then fused to blank 11. The button 12 which is of the higher index glass is ground on one side to conform to the deepest curvature at B''' and having a lower melting point will fuse into the various indentations without disturbing the curvature of the same or marring in anyway the sharp dividing lines between the different curvatures on the basic crown glass lens. The outer curvature is made to conform roughly to the curvature on the segment side of the finished lens, the button being left somewhat larger and thicker to allow for grinding and polishing the segment side of the lens.

The four curvatures referred to in the basic lens bring about in the finished lens, when the glass of higher refractive power is inserted, the various focal distances for the lower portion of the lens. It is claimed or understood that in this invention the glass of higher refractive index need not necessarily be fused into the basic lens but can be inserted step by step and cemented together with any transparent cement, the results in either case being the same. It is also claimed or understood that the index of refraction of the glass fused or cemented into the various indentations need not be uniform but can be varied so that in one indentation a lens of a lower or higher index of refraction may be either fused or cemented in that way regulating and giving a wide range to the refractive power of the segments.

The segment E (Figure 3) is termed a central lens and formed with reversely curved sides 13, 14, an apex 15 and curved botom 16. The segment E gradually increases in thickness from 14, an apex 15 and curved bottom 16. The segment E also increases in thickness from each end towards its transverse median.

The segments C and D are termed side lenses and each includes reversely curved top and bottom edges 17, 18 which merge into each other at their outer ends. The inner side 19 of each side edge is curved, as at 19, to conform to the curvature of a side of the central lens. The side lenses are oppositely disposed with respect to each other. Each side lens decreases in thickness from approximately the center thereof towards its edges.

The segment B is termed an outer lens and has reversely curved top and bottom edges 20, 21 respectively and gradually decreases in thickness from its center towards its edges.

In the illustrations the central, side and outer lenses provided by segments E, C, D and B respectively are of plano-convex contour, but the central and side lenses are oppositely disposed with respect to the outer lens and in this connection see Figures 5, 6, 16 and 17. The contour of these lenses, however, will change depending upon the curvature of indentation A.

The lens when formed comprises a distant field 22, a reading field 23, an intermediate field located at opposite sides of the field 23 as at 24, 25, and an upper field 26 interposed between the field 22 and the reading and intermediate fields. See Figures 1 and 15. The reading, upper and intermediate fields are located at the lower portion of the lens.

Figure 20:
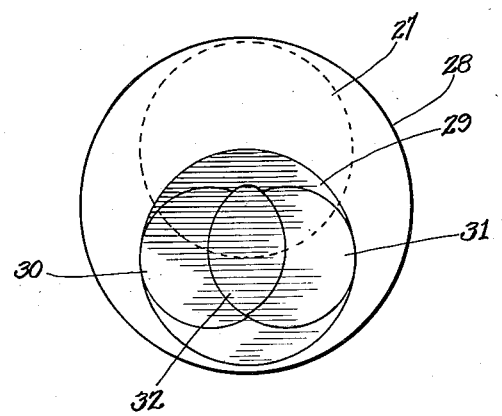
Figure 20 illustrates in front elevation an arrangement of coacting elements from which a modified form of lens is produced.
Figure 21:
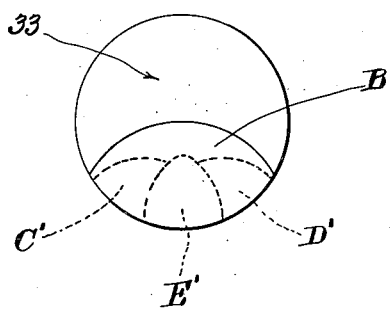
Figure 21 is a front elevation of the modified form of lens produced from the coacting elements shown in Figure 20.

Referring to Figures 20 and 21 of the drawing the basic crown glass lens 27 is delineated upon a blank 28. The buttons which provide the segments B', C', D' and E' are indicated at 29, 30, 31 and 32, respectively. The blank 28 and buttons 30, 31 and 32 are indented in the same manner as that referred to in connection with the production of the lens 8, with this exception that the shape of the indentation in which is arranged segment E' has its top upon a circular arc at its intersection with that indentation which corresponds to indentation A, and by this arrangement the segments E' when completed has its top edge upon a circular arc. The arrangement of segment E' further differs from segment E in that it is not completely encompassed at its top by segments C', D' in the manner as segment E is encompassed by segments C, D. A further difference is that segments C', D' are so arranged relative to segments E' that the latter extends beyond the upper ends of the inner sides of segments C', D'. The segment E' however is of substantially sistroidal contour. The manner of setting up segment E' makes the area of the reading field larger with respect to the field provided by segment E. The completed lens having as a part thereof segment E' is indicated at 33.

Figure 22:
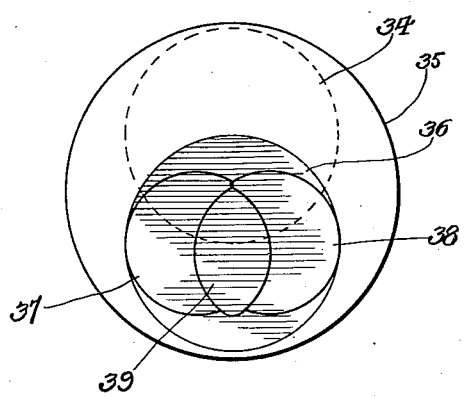
Figure 22 illustrates in front elevation an rarangement of coacting elements from which another modified form of lens is produced.
Figure 23:
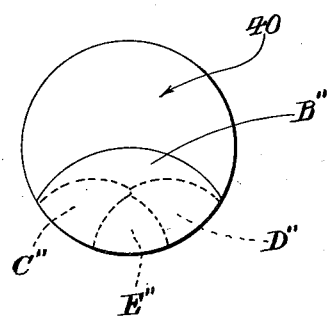
Figure 23 is a front elevation of the modified form of lens produced from the coacting elements shown in Figure 22.

Referring to Figures 22 and 23 of the drawings the basic crown glass lens 34 is delineated upon a blank 35. The buttons which provide the segments B'', C'', D'' and E'' are indicated at 36, 37, 38 and 39, respectively. The blank 35 and the buttons 37, 38 and 39 are indented in the same manner as that referred to in connection with the production of lens 8, that the shape of the indentation in which is arranged segment E'' is the same as, but of less area than the indentation in which is arranged the segment E. Then further segment E'' is of less height than segment E and segments C'' and D'' have the upper portions of the inner sides thereof meet upon a straight line above segment E''. The meeting edges of segments C'' and D'' align with the longitudinal median of segment E'' and the latter is substantially of conoidal contour. The completed lens having as a part thereof the segment E'' is indicated at 40.

Otherwise than that as stated with respect to the form of lenses 33 and 40 shown in Figures 21 and 23, they are produced in the same manner as that referred to in connection with the form of lens 8. The lenses 33 and 40 each include a distant field corresponding to field 22, a reading field corresponding to field 23, an intermediate field located on opposite sides of the reading field and corresponding to the intermediate field indicated at 24, 25, and an upper field corresponding to the field 26. The upper field of the lens 33 is located between the distant field and the reading field and the two-part intermediate field. The upper field of the lens 40 is located between the distant field and the two-part intermediate field. The cross sectional contour of the segments of the lenses 33 and 34 is the same as that of the segments of the lens 8. The lens 33 and 40 function in the same manner as lens 8.

What I claim is:—

1. A multifocal lens comprising a basic lens, having an undiversified portion thereof constituting a distant vision field, of minor focal power, and having the lower portion diversified into a plurality of fields of vision including a lowermost reading field of major focal power, fields laterally of said reading field having focal power less than said reading field, and a transition field above said reading field having a power greater than that of the basic lens but less than that of said lateral fields.

2. A multifocal lens comprising a basic lens having an undiversified portion thereof constituting a distant vision field of minor focal power, and having the lower portion diversified into a plurality of fields of vision including a lowermost reading field of major focal power, fields laterally of said reading field having focal power less than said reading field, and a transition field above said reading field having a focal power greater than that of the basic lens but less than that of said lateral fields, the reading field being of sistroidal contour.

3. A multifocal lens comprising a basic lens having an undiversified portion constituting a distant vision field of minor focal power and having the lower portion diversified into fields of various focal powers greater than that of the distant field, said diversifications comprising depressions in said basic lens having various degrees of concavity, the depression of greatest concavity occupying the lowermost position, the depressions of next deepest concavity occupying positions laterally on opposite sides of depression of deepest concavity, a depression of least concavity positioned above the depression of deepest concavity, and a glass body of greater refractive index than said basic lens having its lower surface conforming in fused relation to the aggregate contour of said several depressions.

4. A multifocal lens comprising a basic lens, having a portion thereof constituting a distant vision field, of minor focal power, a reading field of major focal power, a transition field between said distant vision field and said reading field, of intermediate focal power and fields laterally of said reading field and below said transition field, the reading field being of sistroidal contour and having its apical angle terminating in the line of demarcation between the transition and lateral fields.

5. A multifocal lens comprising a basic lens, having an undiversified portion thereof constituting a distant vision field, of minor focal power, and having the lower portion diversified into a plurality of fields of vision including a reading field of major focal power, and lateral fields of intermediate focal power, said lateral fields being formed by independently ground depressions in said basic lens, said reading field being formed by a depression intersecting said lateral depressions, all of said depressions being ground into the same side of the basic lens and lenses of greater refractive index than said basic lens seating in said depressions and being fusibly conformed and united to the surfaces of said depressions.

6. A multifocal lens blank comprising a basic lens, having an undiversified portion thereof constituting a distant vision field, of minor focal power, and having the lower portion diversified into a plurality of fields of vision including a reading field of major focal power, and lateral fields of intermediate focal power, said lateral fields being formed by ground surfaces in said basic lens, said reading field being formed by a ground surface intersecting said lateral ground surfaces and a lens portion of different refractive index from said basic lens fused to said ground surfaces.

7. A multifocal lens comprising a basic lens having an undiversified portion thereof constituting a distant vision field, of minor focal power, and having the lower portion thereof diversified into a plurality of fields of vision comprising depressions independently concavely ground into the basic lens, and occupied by lenses of glass of greater index of refraction than the basic lens, fusibly united and conformed with the surfaces of said depressions, said fields of vision including a lowermost reading field of major focal power, fields laterally of said reading field having focal power less than that of the reading field, and a transition field above said reading field having a focal power greater than that of the basic lens but less than that of said lateral fields.

8. A multifocal lens comprising a basic lens having an undiversified portion thereof constituting a distant vision field, of minor focal power, and having the lower portion thereof diversified into a plurality of fields of vision comprising depressions independently concavely ground into the basic lens, and occupied by lenses of glass of greater index of refraction than the basic lens, fusibly united and conformed with the surfaces of said depressions, said fields of vision including a lowermost reading field of major focal power, fields laterally of said reading field having focal power less than that of the reading field, and a transition field above said reading field having a focal power greater than that of the basic lens but less than that or those of said lateral fields, the reading field being of sistroidal shape.

9. A multifocal lens comprising a basic lens having a portion thereof constituting a field of minor focal power, a reading field of major focal power, and fields laterally of said reading field and below the field of minor focal power, the reading field being of sistroidal contour and having its apical angle terminating in the line of demarcation between the field of minor focal power and the lateral fields which lie below it.

OTTO G. HAUSSMANN.